(12) United States Patent
Kim

(10) Patent No.: US 9,491,006 B2
(45) Date of Patent: *Nov. 8, 2016

(54) RECEIVER AND RECEPTION METHOD FOR ESTIMATING CHANNEL IN AN ORTHOGONAL FREQUENCY DIVISION MULTIPLE ACCESS SYSTEM

(71) Applicant: Samsung Electronics Co., Ltd., Suwon-si, Gyeonggi-do (KR)

(72) Inventor: Sung-Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,859

(22) Filed: Aug. 24, 2015

(65) Prior Publication Data

US 2015/0365258 A1   Dec. 17, 2015

Related U.S. Application Data

(63) Continuation of application No. 14/171,248, filed on Feb. 3, 2014, now Pat. No. 9,124,453, which is a continuation of application No. 12/184,090, filed on Jul. 31, 2008, now Pat. No. 8,649,253.

(30) Foreign Application Priority Data

Jul. 31, 2007  (KR) .................. 10-2007-0076988

(51) Int. Cl.
*H04L 25/02* (2006.01)
*H04L 5/00* (2006.01)
*H04L 27/26* (2006.01)

(52) U.S. Cl.
CPC ......... *H04L 25/0208* (2013.01); *H04L 5/0007* (2013.01); *H04L 25/0204* (2013.01); *H04L 25/0212* (2013.01); *H04L 27/2607* (2013.01); *H04L 27/2665* (2013.01)

(58) Field of Classification Search
CPC ............ H04L 5/0007; H04L 25/0208; H04L 5/0003; H04L 25/0202; H04L 25/0204; H04L 25/0212; H04L 27/2607; H04L 27/265; H04L 27/2665; H04L 27/2675; H04J 11/00; H04J 11/0009; H04J 11/0016; H04J 11/002; H04J 2211/00; H04J 2211/006; H04J 2211/008
USPC ........ 375/260, 262, 265, 267; 370/208, 210, 370/344
See application file for complete search history.

(56) References Cited

U.S. PATENT DOCUMENTS 8,649,253 B2      2/2014  Kim
2003/0054755 A1*  3/2003  Zehavi ................. H04K 3/228
                                                    455/1

(Continued)

FOREIGN PATENT DOCUMENTS

KR   10-2006-0101646 A    9/2006

*Primary Examiner* — Young T Tse
(74) *Attorney, Agent, or Firm* — Jefferson IP Law, LLP

(57) ABSTRACT

A receiver and reception method for estimating a channel in an Orthogonal Frequency Division Multiple Access (OFDMA) system is provided. The receiver includes a delay estimator for estimating, from a signal received from a transmitter through multipaths, at least one of an average time delay of the multipaths and a time delay of one of the multipaths having a maximum power among the multipaths, a rotator for circular-rotating the received signal using the estimated delay, and a channel estimator for estimating a channel impulse response of the circular-rotated signal.

10 Claims, 14 Drawing Sheets

(56) References Cited

U.S. PATENT DOCUMENTS

| | | |
|---|---|---|
| 2003/0063678 A1 | 4/2003 | Crawford |
| 2004/0120248 A1* | 6/2004 | Lee .................... H04L 27/2676 370/208 |
| 2004/0247044 A1 | 12/2004 | Matsushita et al. |
| 2005/0009488 A1* | 1/2005 | Lee .................... H04L 27/0002 455/232.1 |
| 2005/0163238 A1 | 7/2005 | Fujii |
| 2006/0029164 A1 | 2/2006 | Hwang |
| 2006/0239178 A1 | 10/2006 | Svensson et al. |
| 2008/0218403 A1 | 9/2008 | Lee et al. |
| 2008/0219144 A1* | 9/2008 | Brehler ............... H04L 27/2695 370/203 |

\* cited by examiner

RECEIVER AND RECEPTION METHOD FOR ESTIMATING CHANNEL IN AN ORTHOGONAL FREQUENCY DIVISION MULTIPLE ACCESS SYSTEM

PRIORITY

This is a continuation application of a prior U.S. application Ser. No. 14/171,248, filed on Feb. 3, 2014, which issued as U.S. Pat. No. 9,124,453 on Sep. 1, 2015; which is a continuation of U.S. patent application Ser. No. 12/184,090, filed on Jul. 31, 2008, which issued as U.S. Pat. No. 8,649,253 on Feb. 11, 2014; and claims the benefit under 35 U.S.C. §119(a) of a Korean patent application filed in the Korean Intellectual Property Office on Jul. 31, 2007 and assigned Serial No. 10-2007-0076988, the entire disclosure of each of which is hereby incorporated by reference.

BACKGROUND OF THE INVENTION

1. Field of the Invention

The present invention relates to an Orthogonal Frequency Division Multiple Access (OFDMA) system. More particularly, the present invention to a receiver and a reception method for estimating channels in an OFDMA system.

2. Description of the Related Art

Orthogonal Frequency Division Multiplexing (OFDM) is a transmission scheme that converts a serial input data stream into N parallel data streams and carries the converted N parallel data streams on separate individual subcarriers, thereby increasing a data rate. When the OFDM transmission scheme is used for non-broadcast cellular mobile communication, wireless Local Area Network (LAN), wireless mobile Internet, etc., a Multiple Access scheme for multiple users is needed together with a single-carrier transmission scheme. Therefore, OFDMA is used as an OFDM-based Multiple Access scheme.

Orthogonal Frequency Division Multiple Access (OFDMA) is a scheme in which each user uses a number of subchannels and a number of OFDM symbols. In the OFDMA scheme, the user allocates the number of subcarriers and the number of OFDM symbols differently according to the transfer rate required by each user, thereby ensuring efficient resource distribution.

The terms 'OFDM' and 'OFDMA' will both be referred to herein as 'OFDM' unless stated otherwise.

In the OFDM system, high-speed data transmission is required. For the high-speed data transmission, high-order modulation schemes (e.g., 16-ary Quadrature Amplitude Modulation (16-QAM) and 64-ary QAM (64-QAM)) are needed. The high-order modulation scheme-based transmission method exerts an influence on performance according to the channel state. That is, the high-order modulation scheme has a very high transfer rate in a good channel state but requires retransmission in a poor channel state, thus experiencing greater performance degradation when compared with the low-order modulation schemes (e.g., Binary Phase Shift Keying (BPSK) and Quadrature PSK (QPSK)). Therefore, it is important to correctly estimate the channel state and use a modulation scheme suitable thereto.

A method for estimating the channel state in the OFDM system will be described. A transmitter transmits a base code or a pilot signal previously agreed upon with a receiver, and the receiver performs channel estimation using the base code or the pilot signal.

In the receiver of the OFDM system, a channel estimator greatly changes in performance according to frequency selectivity of the channel. The frequency selectivity is determined herein according to the time delay (or delay spread) characteristic of a multipath channel. That is, an increase in the time delay of a channel causes an increase in the frequency selectivity, and the increase in the frequency selectivity reduces channel estimation performance in the OFDM system using a pilot structure.

FIG. 1 is a block diagram illustrating a structure of a receiver in a conventional OFDM system.

Since the signal received at a receiver from a transmitter is an analog signal, an Analog-to-Digital Converter (ADC) 101 converts the received analog signal into a digital signal. An Automatic Frequency Control (AFC) unit 103 cancels a frequency offset through frequency control on the digital signal, and a Symbol Timing Recovery (STR) unit 105 sets an optimal Fast Fourier Transform (FFT) window for the frequency offset-canceled received signal. An FFT unit 107 performs an FFT on a received signal in the window to convert a time-domain received signal into a frequency-domain received signal, and a channel estimator 109 performs channel estimation by extracting a pilot signal from the frequency-domain received signal. An equalizer 111 performs channel equalization on the frequency-domain received signal using a channel impulse response estimated by the channel estimator 109. A Forward Error Correction (FEC) unit 113 extracts information bits by performing channel decoding on the channel-equalized input signal.

When the STR unit 105 in the conventional receiver of FIG. 1 sets an FFT window, Inter-Symbol Interference (ISI) may occur due to a precursor of a channel.

FIG. 2 is a diagram illustrating an example in which ISI occurs during an FFT window setting in the conventional STR unit of FIG. 1.

In the receiver, a received signal is expressed as a sum of several transmission signals 202 as shown in Equation (1), due to time delays 201 of channels.

$$y(n) = h(n) * x(n) \qquad (1)$$
$$= \left(\sum_{l=0}^{L-1} h_l \delta(n - \tau_l)\right) * x(n)$$
$$= \sum_{l=0}^{L-1} h_l x(n - \tau_l)$$

In Equation (1), h(n) denotes a channel impulse response, x(n) denotes a transmission signal corresponding to one OFDM symbol, y(n) denotes a received signal corresponding to one OFDM symbol, and is denotes a discrete time index. Further, in Equation (1), L denotes the number of multipaths, l denotes an index of a multipath, $h_l$ denotes a channel impulse response of each multipath, and $\tau_l$ denotes a time delay of each multipath.

To prevent ISI, the OFDM system inserts a Guard Interval (GI) 203 into an OFDM symbol. In this case, the GI 203 generally has a longer length than the maximum time delay of the channel in the time domain.

With reference to FIG. 2 and under the assumption that the multipath channel is composed of two multipaths, a description will be made of an example in which ISI occurs due to a channel precursor.

Referring to FIG. 2, the STR unit 105 sets the part obtained by excepting a GI from a received signal, as an FFT window 204 of an $N^{th}$ OFDM symbol, on the basis of the path having the highest power among the multipaths. However, when a precursor exists in the channel, a part 205 of an (N+1)$^{th}$ OFDM symbol is included therein by the channel precursor in the time-domain signal where the FFT window 204 of an N$^{th}$ OFDM symbol is set, thereby generating ISI. In order to address this problem, the STR unit 105 time-advances, as shown by reference numeral 206, an FFT window for an N$^{th}$ OFDM symbol on the basis of the multipath that first occurred in the time domain among the multipaths, in consideration of a non-estimated additional channel precursor.

A received signal in an FFT window having N samples is defined as Equation (2).

$$X(k) = FFT_N\{x(n)\} \qquad (2)$$

$$= \sum_{n=0}^{N-1} x(n) \cdot \exp\left(-j\frac{2\pi k n}{N}\right), k = 0, 1, \ldots, N-1$$

If the FFT window is time-advanced by in samples to prevent ISI, x(n) undergoes circular rotation by in samples due to GI. An OFDM symbol that underwent m-sample circular rotation is defined as Equation (3) after undergoing an FFT.

$$\tilde{X}_m(k) = FFT_N\{x_N(n-m)\} \qquad (3)$$

$$= X(k) \cdot \exp\left(-j\frac{2\pi k m}{N}\right), k = 0, 1, \ldots, N-1$$

In Equation (3), $x_N(n)$ means x(n), to which circular rotation using N as a modulus is applied. That is, $x_N(n)$ is expressed as Equation (4).

$$x_N(n) = x(n \bmod N), n = 0, 1, \ldots, N-1 \qquad (4)$$

When the FFT window is shifted by m samples along the time domain as shown in Equation (3), additional phase rotation occurs in the pre-shifting frequency response as shown in FIGS. 3 and 4.

FIGS. 3 and 4 are diagrams illustrating a channel impulse response and a frequency response for in samples in a conventional OFDM system.

Referring to FIG. 3, a channel impulse response and a frequency response are illustrated for m=0, i.e. when an FFT window is set on the basis of the first multipath. Referring to FIG. 4 shows a channel impulse response and a frequency response are illustrated for m=4, i.e. when an FFT window is set 4 samples in advance of that for the first multipath. In FIGS. 3 and 4, making a comparison between a frequency response for m=0 and a frequency response for m=4, the frequency response for m=4 is higher in frequency selectivity since it is higher in a change rate than the frequency response for m=0.

In the conventional OFDM system, the receiver performs channel estimation with a method using pilot signal-based linear interpolation in order to reduce complexity. As a result, the frequency selectivity of channels has a direct influence on the channel estimation performance. That is, as in the examples of FIGS. 3 and 4, it is advantageous to set an FFT window after sufficiently shilling it forward while taking the channel precursor into account, in order to prevent ISI. However, in this case, channel estimation performance may be reduced in the situation where no ISI occurs.

Therefore, there is a demand for a receiver and a reception method for solving the channel estimation performance reduction problem caused by the FFT window setting at the receiver of the conventional OFDM system, and for improving channel estimation performance of a channel having a large time delay.

SUMMARY OF THE INVENTION

An aspect of the present invention is to address at least the above-mentioned problems and/or disadvantages and to provide at least the advantages described below. Accordingly, an aspect of the present invention is to provide a receiver and reception method for improving channel estimation performance using time delay characteristics of channels.

According to one aspect of the present invention, a receiver for estimating a channel in an Orthogonal Frequency Division Multiple Access (OFDMA) system is provided. The receiver includes a delay estimator for estimating, from a signal received from a transmitter through multipaths, at least one of an average time delay of the multipaths and a time delay of one of the multipaths having a maximum power among the multipaths, a rotator for circular-rotating the received signal using the estimated delay, and a channel estimator for estimating a channel impulse response of the circular-rotated signal.

According to another aspect of the present invention, a reception method for estimating a channel in an Orthogonal Frequency Division Multiple Access (OFDMA) system is provided. The reception method includes estimating, from a signal received from a transmitter through multipaths, at least one of an average time delay of the multipaths and a time delay of one of the multipaths having a maximum power among the multipaths, circular-rotating the received signal using the estimated delay, and estimating a channel impulse response of the circular-rotated signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Terms used herein are defined based on functions in the exemplary embodiments of the present invention and may vary according to users, operators' intention or usual practices. Therefore, the definition of the terms should be made based on the contents throughout the specification.

In a receiver of an OFDM system, a conventional channel estimator using a scheme such as pilot-based linear interpolation has a characteristic that its performance reduces as frequency selectivity of channels increases, in addition, the frequency selectivity of channels is proportional to a time delay of channels. Therefore, a channel with a large time delay, having a corresponding high frequency selectivity, is comparatively interior in channel estimation performance to the channel with a small time delay. An average time delay of channels is defined as Equation (5).

$$\bar{\tau} = \frac{\sum_{l=0}^{L-1} |h_l|^2 \tau_l}{\sum_{l=0}^{L-1} |h_l|^2} \quad (5)$$

That is, an average time delay is calculated by dividing each multipath time delay of channels by an average for channel power. As is conventionally known, each multipath time delay is calculated herein by a searcher for multipath reception.

Figure 3:
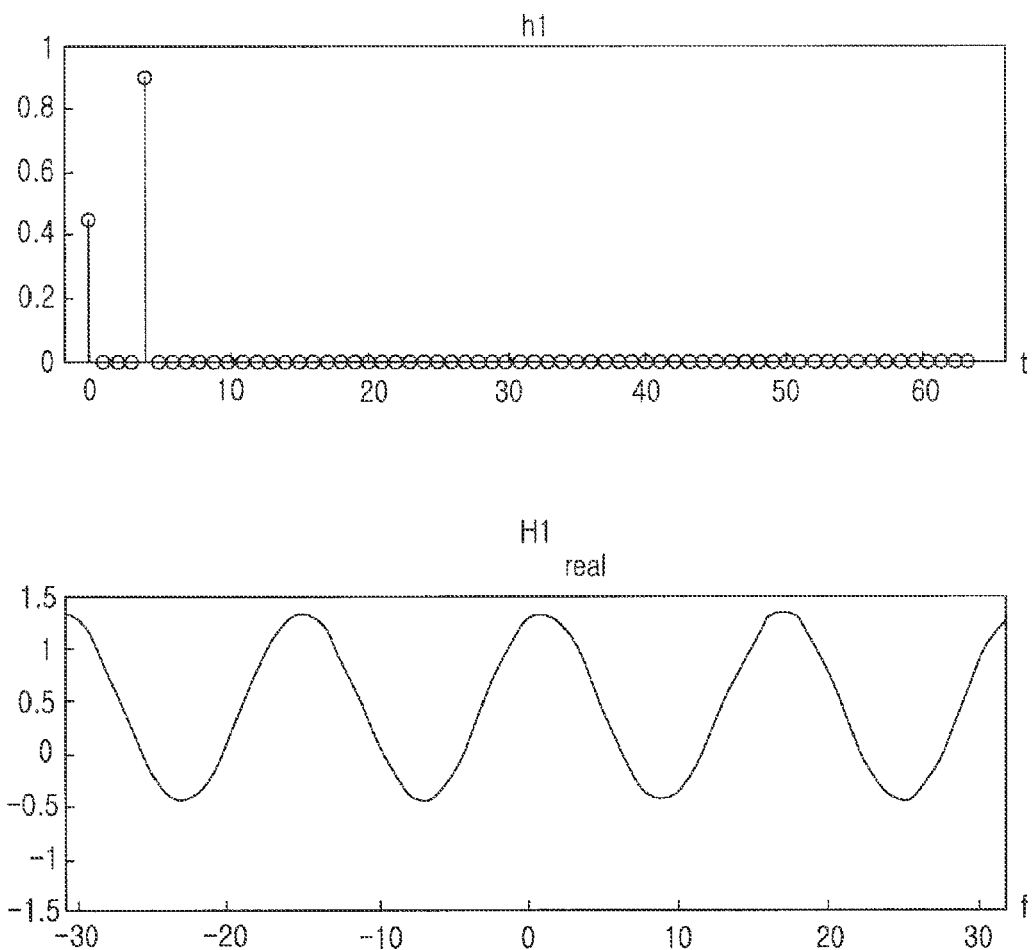
FIGS. 3 and 4 are diagrams illustrating a channel impulse response and a frequency response for m samples in a conventional OFDM system.
Figure 4:
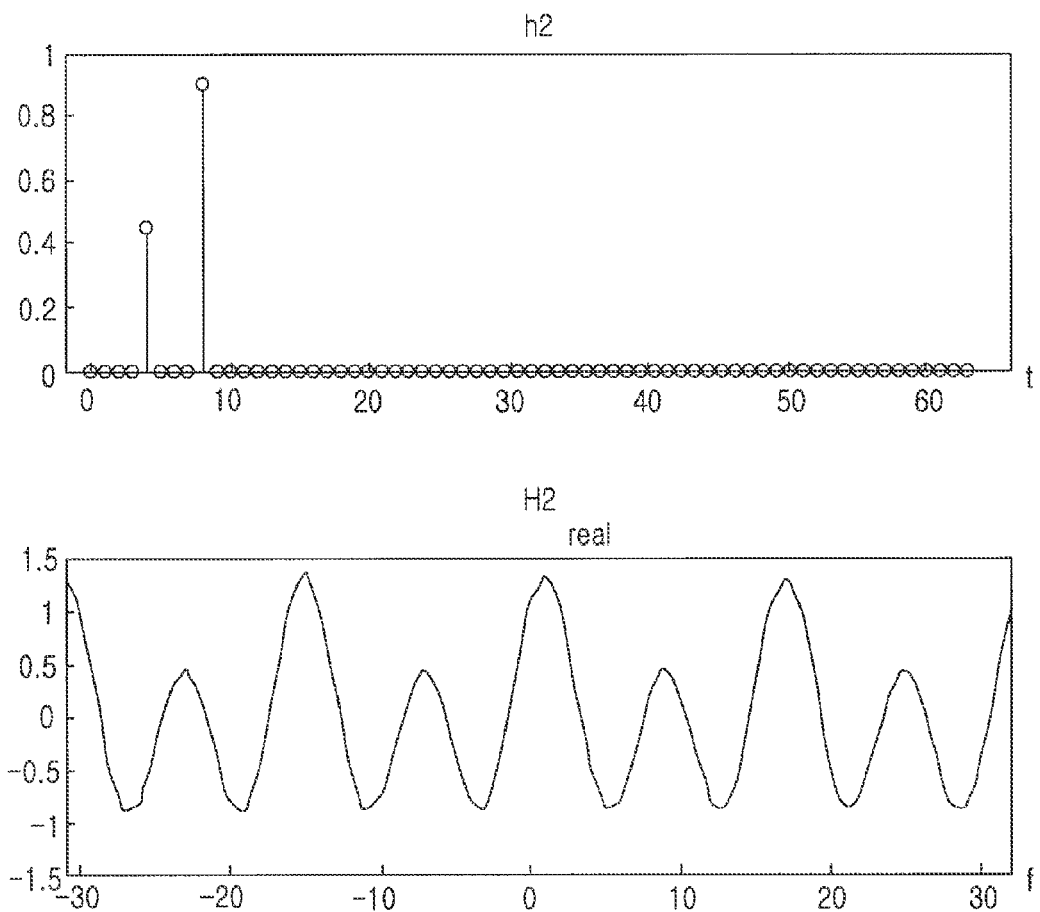

The reason why the frequency selectivity of FIG. 4 is higher than the frequency selectivity of FIG. 3 is because power distribution of channels is excessively distributed toward one side in the FFT window. Therefore, it is possible to minimize the frequency selectivity of channels by reversely performing circular rotation on the received signal by an average time delay of channels according to an exemplary embodiment of the present invention.

Methods for reversely performing circular rotation on the received signal by an average time delay of channels according to an exemplary embodiment of the present invention can be classified into three methods. In the first method (first exemplary embodiment), phase rotation is performed on the received signal after an FFT in the frequency domain. In the second method (second exemplary embodiment), sample rotation is performed on the received signal before an FFT in the time domain. In the third method (third exemplary embodiment), reverse circular rotation is performed on the received signal before an FFT on the basis of a delay value of the path having the maximum multipath power, since a delay value of the path having the maximum multipath power can be estimated with a method such as correlation.

First Exemplary Embodiment

Method for Phase-Rotating a Received Signal after an FFT

The first exemplary embodiment of the present invention phase-rotates the received signal after an FFT so that channel power of the received signal can be symmetrically distributed on the basis of a time index 0 of an FFT window, thereby minimizing a frequency selectivity of channels.

Figure 5:
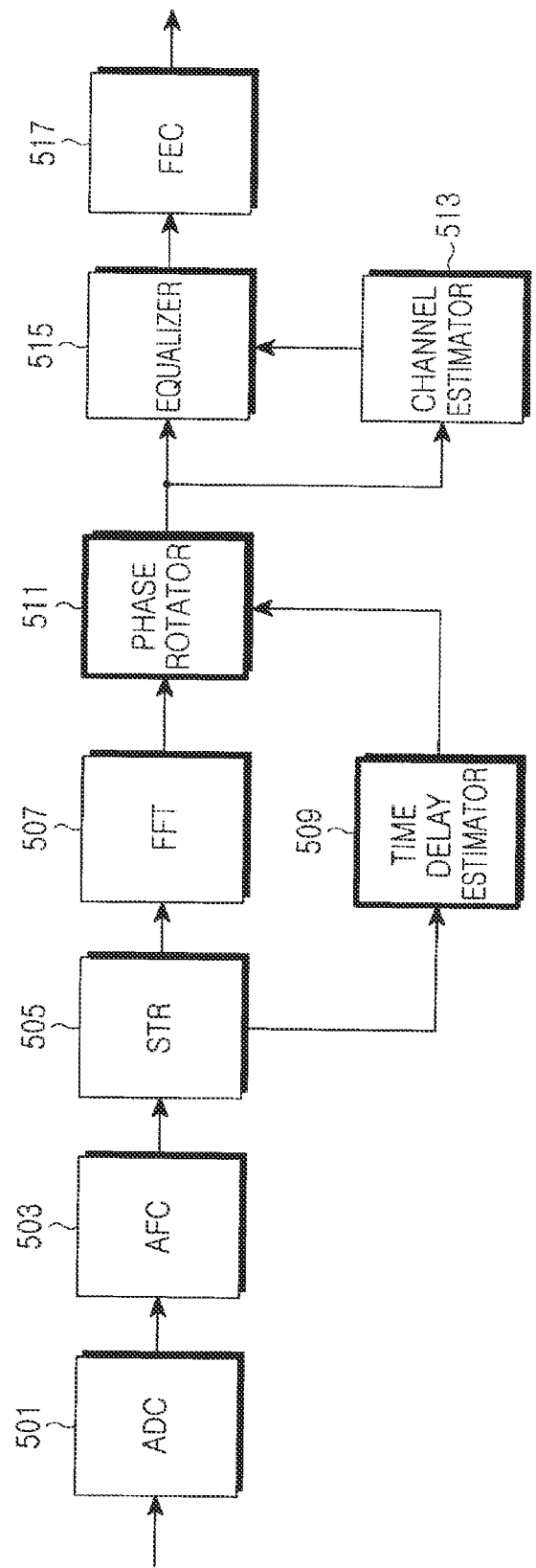
FIG. 5 is a block diagram illustrating a structure of a receiver according to a first exemplary embodiment of the present invention.

FIG. 5 is a block diagram illustrating a structure of a receiver according to the first exemplary embodiment of the present invention.

Figure 1:
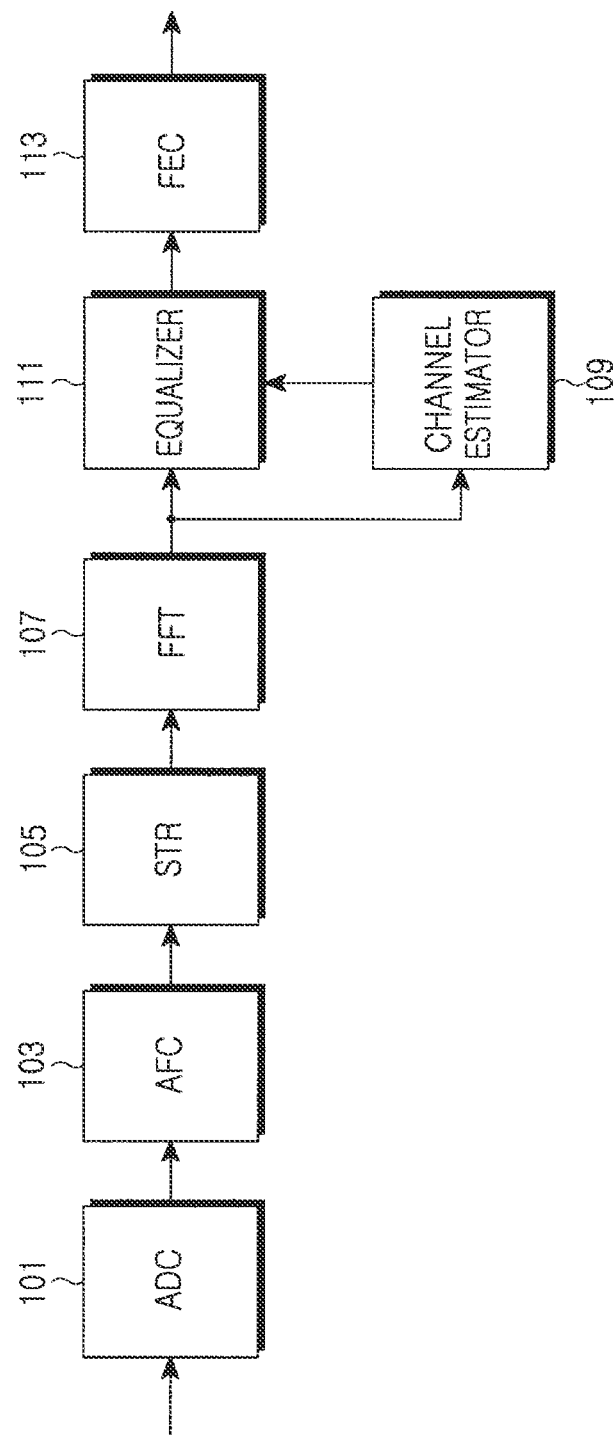
FIG. 1 is a block diagram illustrating a structure of a receiver in a conventional OFDM system.
Figure 2:
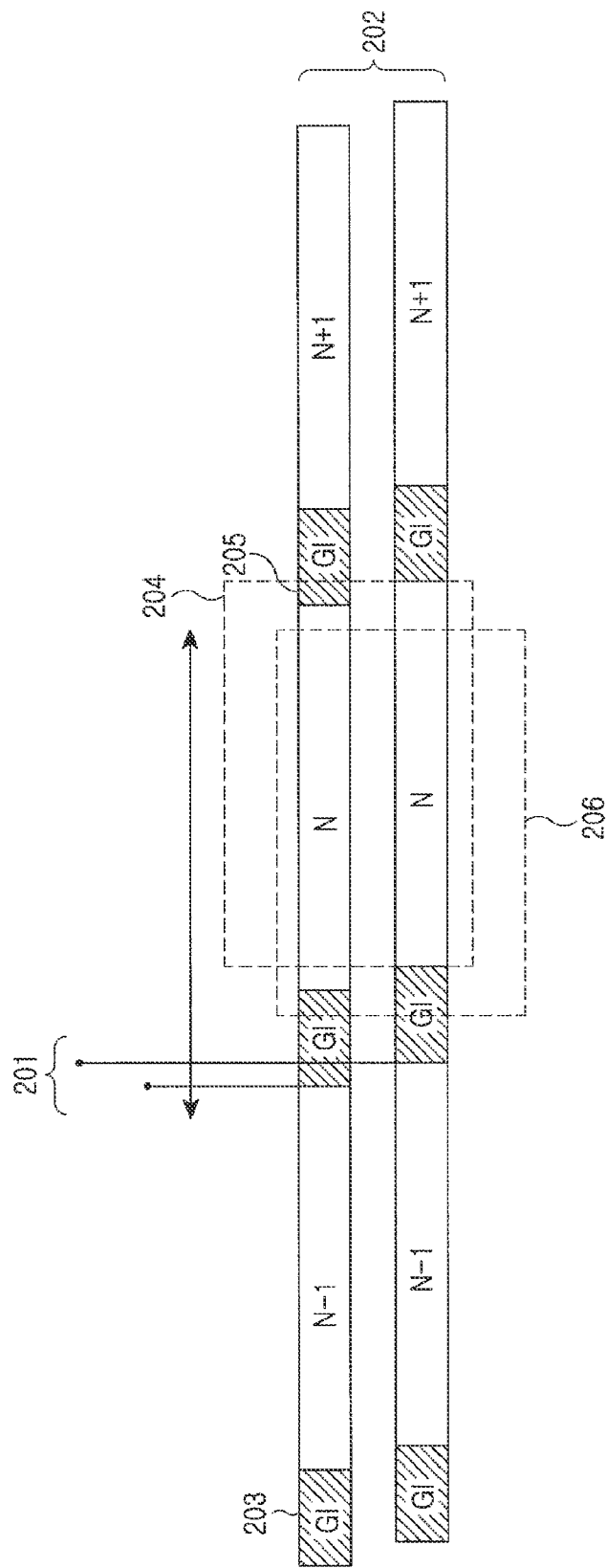
FIG. 2 is a diagram illustrating an example in which ISI occurs during an FFT window setting in the conventional STR unit of FIG. 1.

Referring to FIG. 5, since an ADC unit 501, an AFC unit 503, an STR unit 505, a channel estimator 513, an equalizer 515, and an FEC unit 517 are similar in operation to the conventional ADC unit 101, AFC unit 103, STR unit 105, channel estimator 109, equalizer 111, and FEC unit 113 of FIG. 1, a detailed description thereof will be omitted.

Since the first exemplary embodiment of the present invention phase-rotates the received signal after an FFT, an FFT unit 507 performs an FFT on the received signal in one FFT window of Equation (1), as shown in Equation (6).

$$Y(k) = FFT_N\{y(n)\} \quad (6)$$
$$= FFT_N\{h(n) * x(n)\}$$
$$= H(k)X(k), k = 0, 1, \ldots, N-1$$

A time delay estimator 509 estimates an average time delay for the frequency-domain received signal output from the FFT unit 507 on the basis of the set FFT window using $\tau_l$ and $h_l$ provided from the STR unit 505 as shown in Equation (5).

A phase rotator 511 performs reverse phase rotation on the frequency-domain received signal output from the FFT unit 507 by the estimated average time delay, using Equation (7).

$$\tilde{Y}_{-\tau}(k) = Y(k) \cdot \exp\left(j\frac{2\pi k \bar{\tau}}{N}\right) \tag{7}$$
$$= H(k)X(k) \cdot \exp\left(j\frac{2\pi k \bar{\tau}}{N}\right)$$
$$= \tilde{H}_{-\tau}(k)X(k), k = 0, 1, \ldots, N-1$$

The phase-rotated received signal is provided to the channel estimator 513 and the equalizer 515 to be used for channel estimation and equalization, and the channel estimator 513 performs channel estimation by extracting a pilot signal from the phase-rotated received signal. The equalizer 515 performs channel equalization on the phase-rotated received signal using the channel impulse response estimated by the channel estimator 513, and then provides the channel-equalized received signal to the FEC unit 517.

Figure 6:
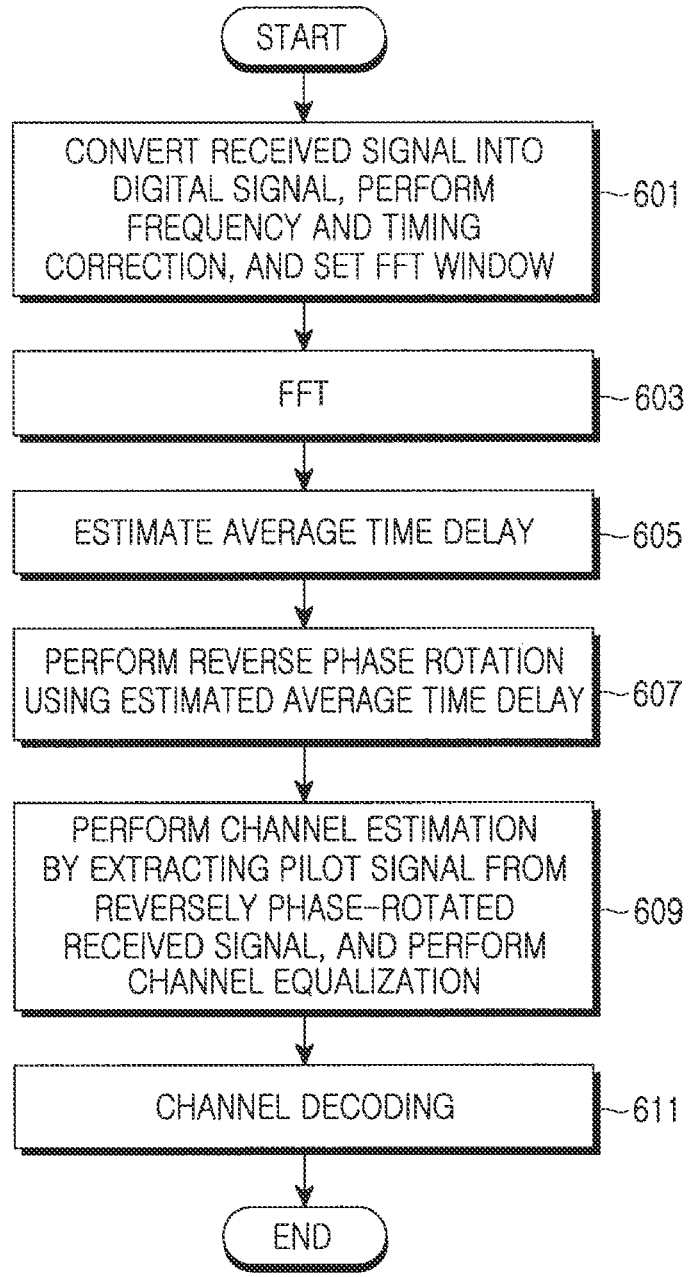
FIG. 6 is a flowchart illustrating a reception method according to the first exemplary embodiment of the present invention.

FIG. 6 is a flowchart illustrating a reception method according to the first exemplary embodiment of the present invention.

In step 601, the ADC unit 501, AFC unit 503 and STR unit 505 convert a received signal into a digital signal, perform frequency correction, perform timing correction, and set an FFT window, to output a received signal in the FFT window corresponding to one OFDM symbol. In step 603, the FFT unit 507 applies an FFT to the received signal using Equation (6). In step 605, the time delay estimator 509 estimates an average time delay for the received signal before application of an FFT using $\tau_l$ and $h_l$ provided from the STR unit 505 as shown in Equation (5). In step 607, the phase rotator 511 performs reverse phase rotation on the FFT-applied frequency-domain received signal using the estimated average time delay, according to Equation (7). In step 609, the channel estimator 513 and equalizer 515 perform channel estimation by extracting a pilot signal from the reversely phase-rotated received signal, and perform channel equalization on the reversely phase-rotated received signal using the estimated channel impulse response. In step 611, the FEC unit 517 performs channel decoding on the channel-equalized input signal.

Second Exemplary Embodiment

Method for Sample-Rotating a Received Signal Before an FFT

The second exemplary embodiment of the present invention sample-rotates a received signal before an FFT so that channel power of the received signal can be symmetrically distributed on the basis of a time index 0 of an FFT window, thereby minimizing a frequency selectivity of channels.

Figure 7:
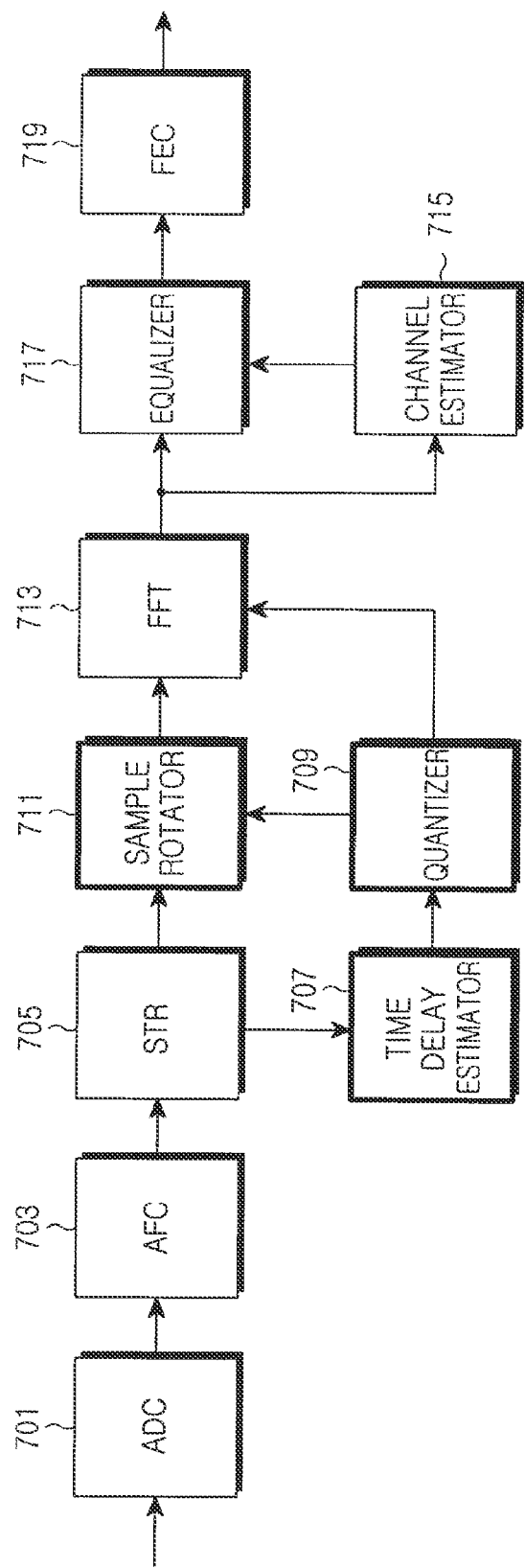
FIG. 7 is a block diagram illustrating a structure of a receiver according to a second exemplary embodiment of the present invention.

FIG. 7 is a block diagram illustrating a structure of a receiver according to the second exemplary embodiment of the present invention.

Referring to FIG. 7, since an ADC unit 701, an AFC unit 703, an STR unit 705, a channel estimator 715, an equalizer 717, and an FEC unit 719 are similar in operation to the ADC unit 101, the AFC unit 103, the STR unit 105, the channel estimator 109, the equalizer 111, and the FEC unit 113 of FIG. 1, a detailed description thereof will be omitted.

A time delay estimator 707 estimates an average time delay for the received signal in one FFT window based on $\tau_l$ and $h_l$ provided from the STR unit 705 using Equation (5).

According to the second exemplary embodiment of the present invention, a reverse circular rotation value should be an integer in order to apply sample rotation in the time domain. However, the average time delay calculated in Equation (5) may not be an integer and may instead be a real number. Accordingly, a quantizer 709 quantizes the average time delay as an integer using Equation (8) in order to apply the time-domain sample rotation.

$$\bar{\tau}_q = \text{round}(\bar{\tau}) \tag{8}$$

Figure 8:
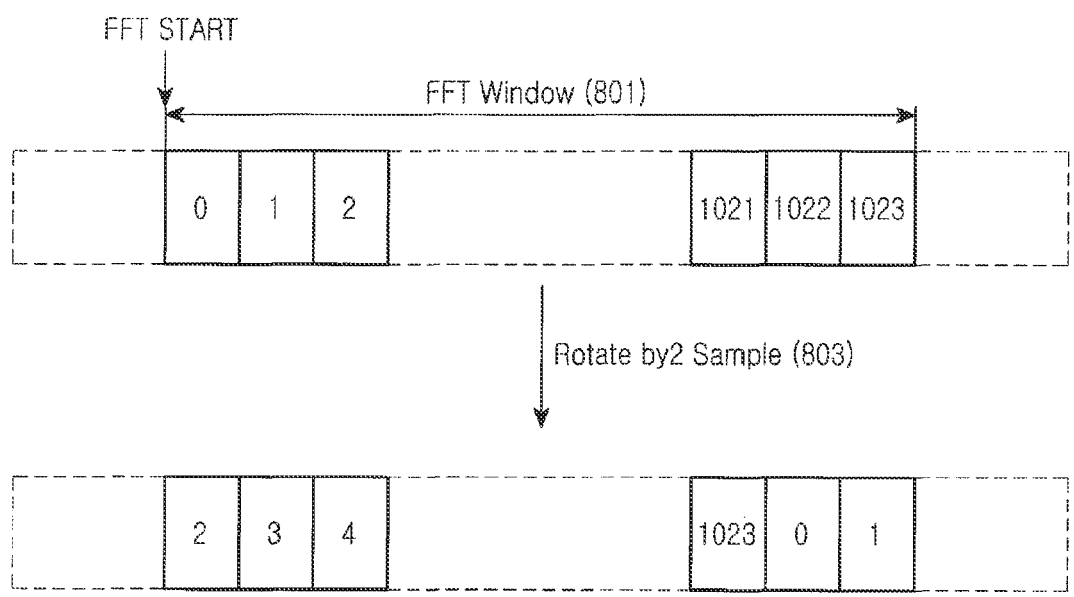
FIG. 8 is a diagram illustrating an exemplary operation of the sample rotator of FIG. 7.

A sample rotator 711 performs time-domain sample rotation on the received signal before it is input to an FFT unit 713, by the quantized average time delay as shown by way of an example in FIG. 8.

FIG. 8 is a diagram illustrating an exemplary operation of the sample rotator 711 in FIG. 7. In FIG. 8, when an average time delay is 2 samples, the sample rotator 711 performs 2-sample rotation on the received signal on the basis of an FFT window 801 starting from a time index 0 in step 803. Since the number of samples included in one FFT window is 1024, the received signal after sample rotation is composed of 1024 samples beginning from the 3$^{rd}$ sample (sample #2) before sample rotation up to the second sample (sample #1).

The FFT unit 713 applies an FFT to the sample-rotated received signal That is, the sample rotator 711 and the FFT unit 713 sample-rotate the received signal and then apply an FFT thereto using Equation (9).

$$\tilde{Y}_{-\tau_q}(k) = FFT_N\{y_N(n+\bar{\tau}_q)\} \tag{9}$$
$$= \tilde{H}_{-\tau_q}(k)X(k), k = 0, 1, \ldots, N-1$$

The frequency-domain received signal output from the FFT unit 713 is provided to the channel estimator 715 and the equalizer 717 so as to be used for channel estimation and equalization, and the channel estimator 715 performs channel estimation by extracting a pilot signal from the frequency-domain received signal. The equalizer 717 performs channel equalization on the phase-rotated received signal using the channel impulse response estimated by the channel estimator 715, and then provides the result to the FEC unit 719.

Figure 9:
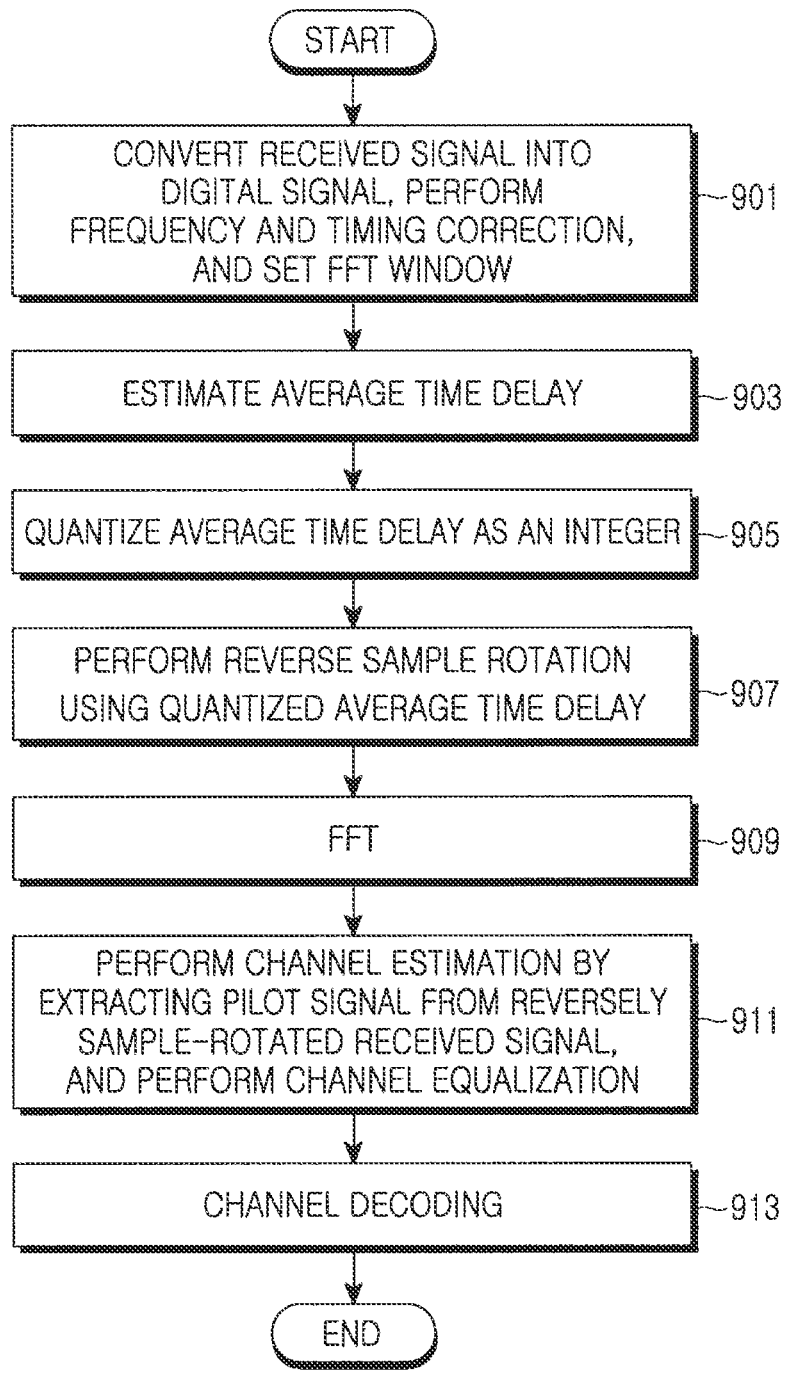
FIG. 9 is a flowchart illustrating a reception method according to the second exemplary embodiment of the present invention.

FIG. 9 is a flowchart illustrating a reception method according to the second exemplary embodiment of the present invention.

In step 901, the ADC unit 701, AFC unit 703 and STR unit 705 convert a received signal into a digital signal, perform frequency and timing correction, and then set an FFT window, to output a received signal in the FFT window corresponding to one OFDM symbol. In step 903, the time delay estimator 707 estimates an average time delay for the received signal before application of an FFT, using Equation (5). In step 905, the quantizer 709 quantizes the average time delay as an integer using Equation (8) in order to apply time-domain sample rotation. In step 907, the sample rotator 711 performs reverse sample rotation on the received signal using the quantized average time delay. In step 909, the FFT unit 713 applies an FFT to the sample-rotated received signal. In step 911, the channel estimator 513 and equalizer 515 perform channel estimation by extracting a pilot signal from the frequency-domain received signal output from the FFT unit 713, and perform channel equalization on the frequency-domain received signal using the estimated channel impulse response. In step 913, the FEC unit 517 performs channel decoding on the channel-equalized input signal.

Figure 10:
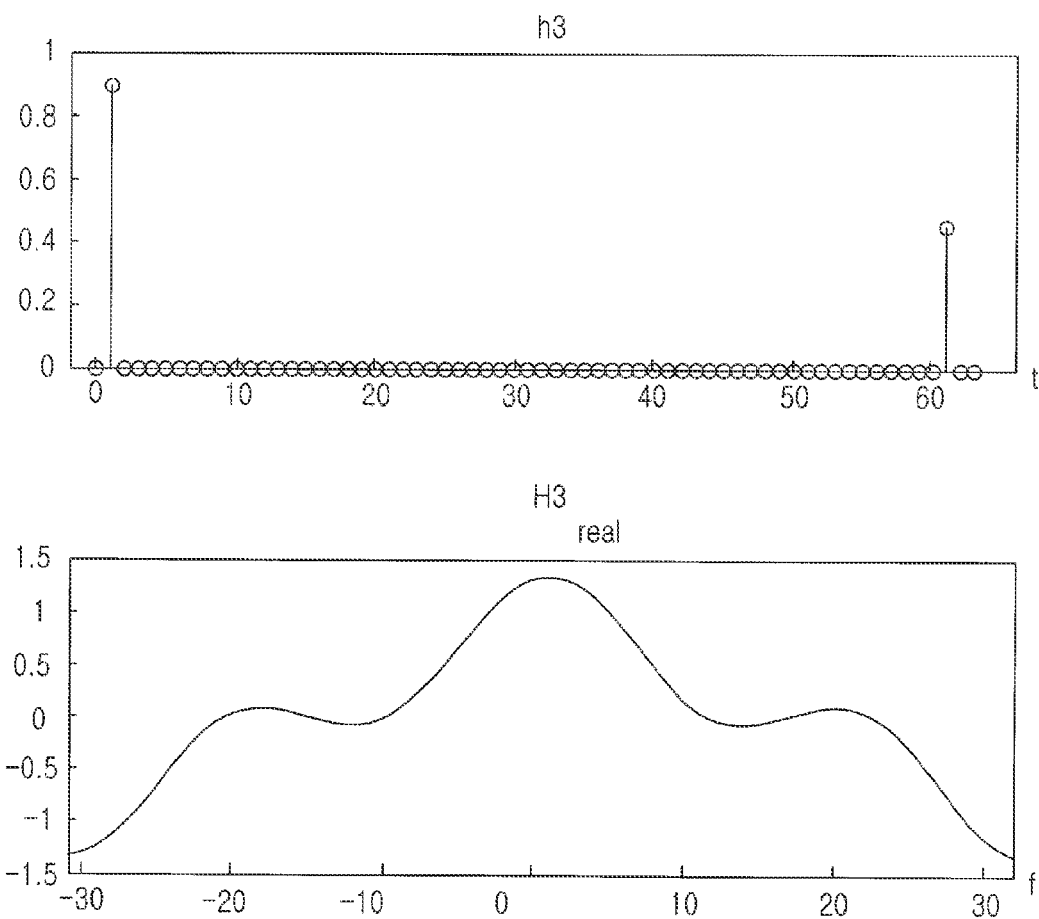
FIG. 10 is a diagram illustrating an impulse response and a frequency response of channels, to which reverse sample rotation is applied by the quantized average time delay of channels, according to the second exemplary embodiment of the present invention.

The impulse response and frequency response of channels to which reverse sample rotation is applied by the quantized average time delay of channels according to the second exemplary embodiment of the present invention are as shown in FIG. 10. It can be seen from FIG. 10 that the frequency selectivity according to the second exemplary embodiment of the present invention is lower than the frequency selectivity of FIGS. 3 and 4. Therefore, the second exemplary embodiment of the present invention can improve channel estimation performance at the receiver.

Third Exemplary Embodiment

Method for Reversely Sample-Rotating a Received Signal Before an FFT on a Basis of a Delay Value of a Maximum-Power Path The power and delay value of each multipath should be estimated for a calculation of an average time delay in Equation (5), and in some cases, estimation of the power and delay value of each multipath is very difficult. However, since a delay value of the multipath having the maximum power can be easily estimated with a method such as correlation, reverse sample rotation is applied on the basis of the delay value of the multipath having the maximum power according to the third exemplary embodiment of the present invention.

Figure 11:
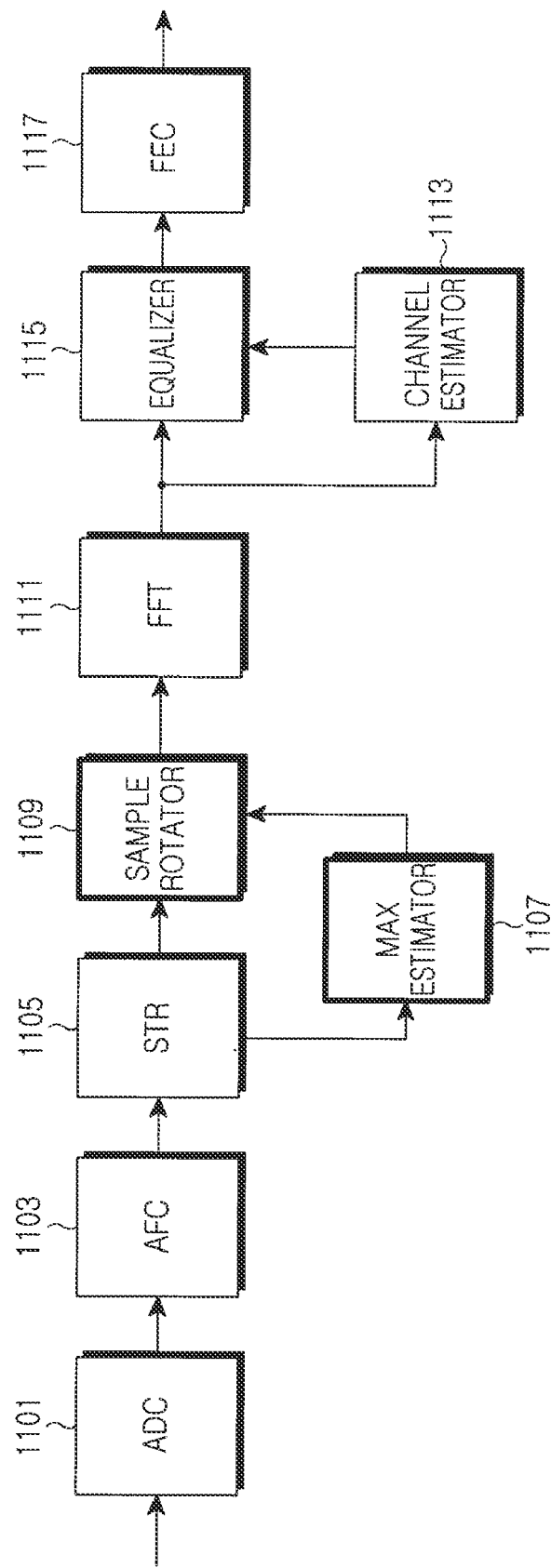
FIG. 11 is a block diagram illustrating a structure of a receiver according to a third exemplary embodiment of the present invention.

FIG. 11 is a block diagram illustrating a structure of a receiver according to the third exemplary embodiment of the present invention.

Referring to FIG. 11, since an ADC unit 1101, an AFC unit 1103, an STR unit 1105, a channel estimator 1113, an equalizer 1115, and an FEC unit 1117 are similar in operation to the conventional ADC unit 101, AFC unit 103, STR unit 105, channel estimator 109, equalizer 111, and FEC unit 113 of FIG. 1, a detailed description thereof will be omitted.

A maximum estimator 1107 estimates a delay value of a path of the multipaths having the maximum power for the received signal in one FFT window on the basis of the set FFT window using $\tau_l$ and $h_l$ provided from the STR unit 1105 as shown in Equation (10).

$$l_{max} = \max_{l} |h_l|^2 \tag{10}$$

A sample rotator 1109 performs sample rotation on the received signal using the estimated delay value. An FFT unit 1111 applies an FFT to the sample-rotated received signal. That is, the sample rotator 1109 and the FFT unit 1111 sample-rotate the received signal, and then apply an FFT thereto using Equation (11).

$$\tilde{Y}_{-\tau_{l_{max}}}(k) = FFT_N\{y_N(n + \tau_{l_{max}})\} \tag{11}$$

$$= \tilde{H}_{-\tau_{l_{max}}}(k)X(k), k = 0, 1, \ldots, N-1$$

The frequency-domain received signal output from the FFT unit 1111 is provided to the channel estimator 1113 and equalizer 1115 to be used for channel estimation and equalization, and the channel estimator 1113 performs channel estimation by extracting a pilot signal from the frequency-domain received signal. The equalizer 1115 performs channel equalization on the phase-rotated received signal using the channel impulse response estimated by the channel estimator 1113, and then provides the result to the FEC unit 1117.

Figure 12:
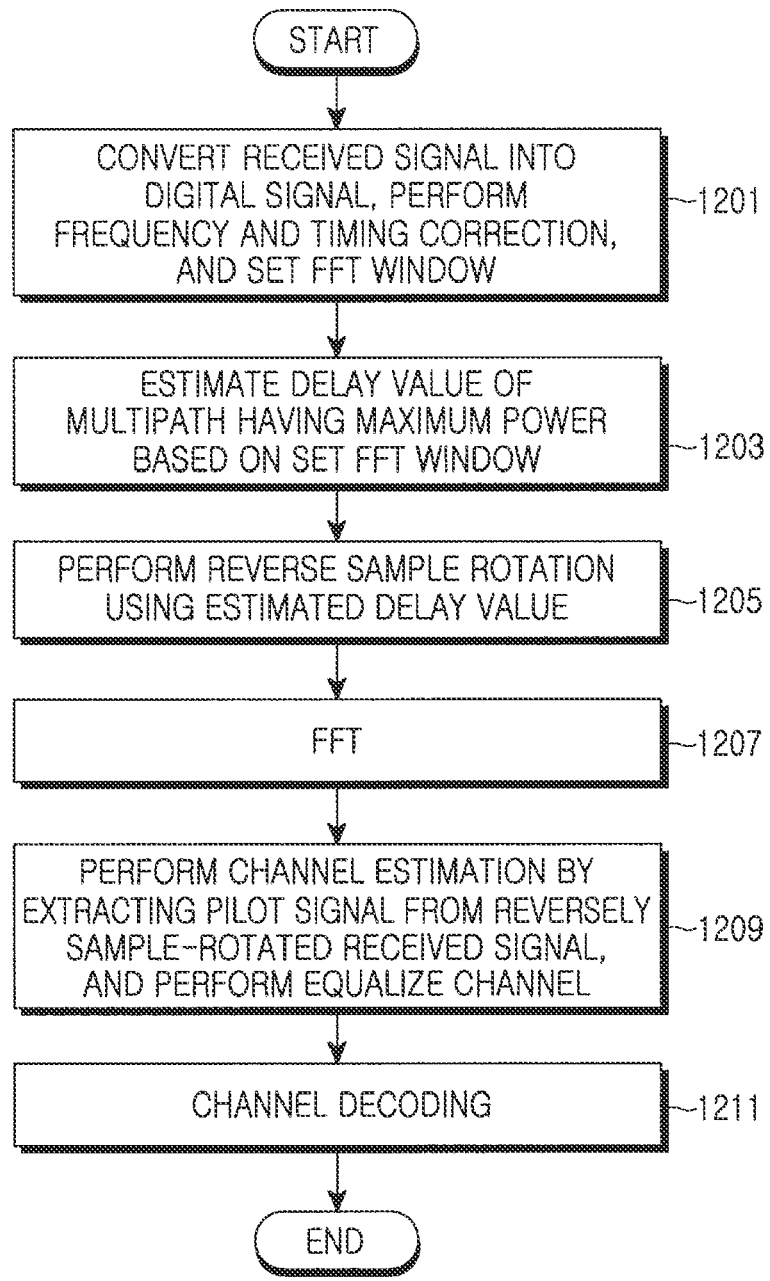
FIG. 12 is a diagram illustrating a reception method according to the third exemplary embodiment of the present invention.

FIG. 12 is a diagram illustrating a reception method according to the third exemplary embodiment of the present invention.

In step 1201, the ADC unit 1101, AFC unit 1103 and STR unit 1105 convert a received signal into a digital signal, perform frequency and timing correction, and then set an FFT window, to output a received signal in the FFT window corresponding to one OFDM symbol. In step 1203, the maximum estimator 1107 estimates a delay value of the path of the multipaths having the maximum power from the received signal on the basis of the set FFT window using $\tau_l$ and $h_l$ provided from the STR unit 1105 as shown in Equation (10). In step 1205, the sample rotator 1109 performs sample rotation on the received signal using the estimated delay value. In step 1207, the FFT unit 1111 applies an FFT to the sample-rotated received signal. In step 1209, the channel estimator 1113 and equalizer 1115 perform channel estimation by extracting a pilot signal from the FFT-applied frequency-domain received signal, and perform channel equalization on the frequency-domain received signal using the estimated channel impulse response. In step 1211, the FEC unit 1117 performs channel decoding on the channel-equalized input signal.

Figure 13:
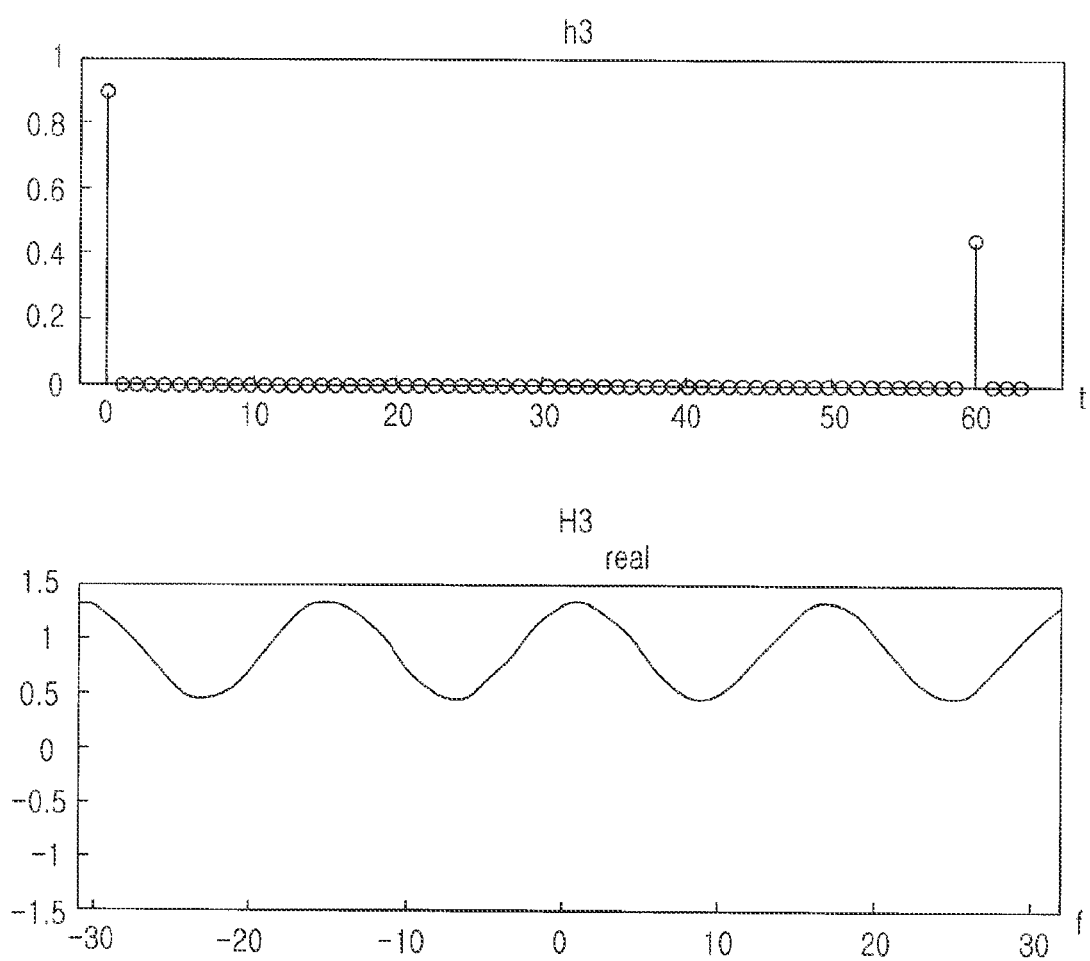
FIG. 13 is a diagram illustrating an impulse response and frequency response of channels, to which reverse sample rotation is applied on the basis of a delay value of the multipath having the maximum power, according to the third exemplary embodiment of the present invention.

The impulse response and frequency response of channels to which reverse sample rotation is applied on the basis of the delay value of the multipath having the maximum power according to the third exemplary embodiment of the present invention are as shown in FIG. 13. It can be seen from FIG. 13 that the frequency selectivity according to the third exemplary embodiment of the present invention is lower than the conventional frequency selectivity since the frequency response according to an exemplary embodiment of the present invention is lower in a change rate than the conventional frequency response. Therefore, the third exemplary embodiment of the present invention can improve channel estimation performance at the receiver.

Figure 14:
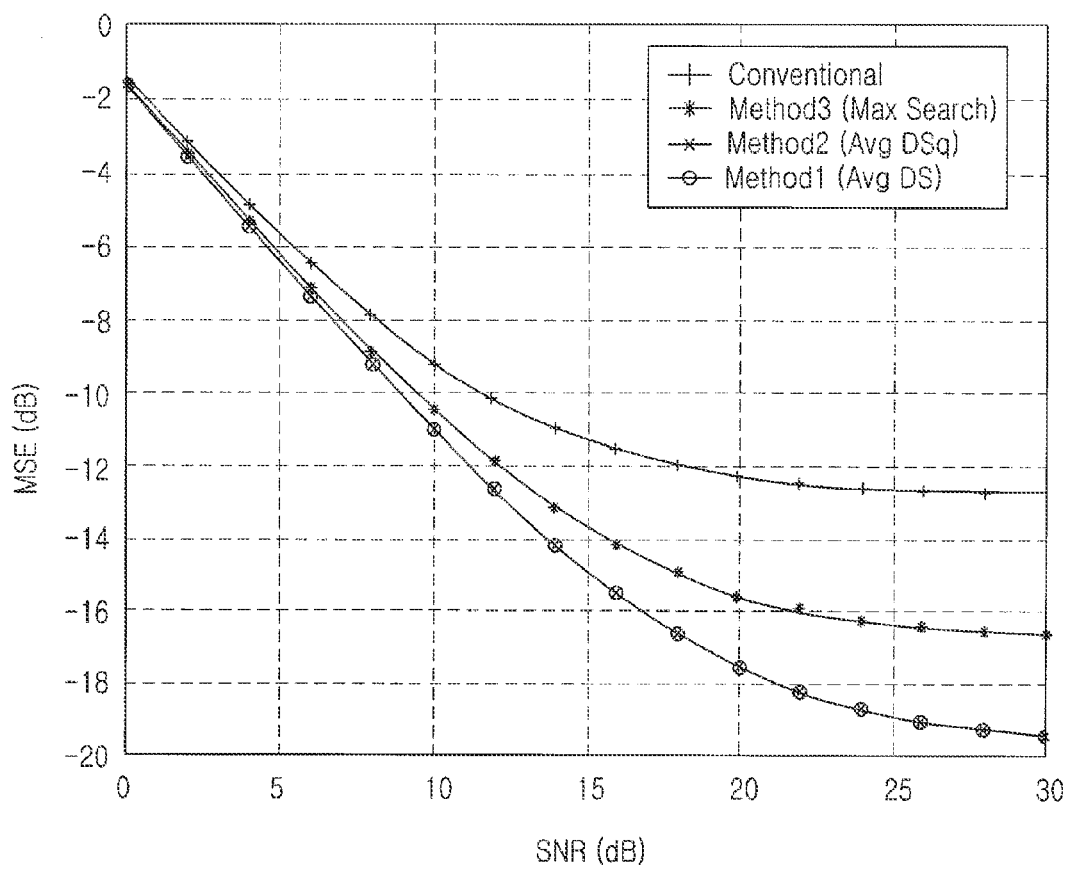
FIG. 14 is a diagram illustrating a comparison between the conventional channel estimation performance and the channel estimation performance based on the first to third exemplary embodiments of the present invention.

A comparison between the channel estimation performance at the receiver according to the first through third exemplary embodiments and the channel estimation performance at the conventional receiver is illustrated in FIG. 14.

FIG. 14 is a diagram illustrating a comparison between the conventional channel estimation performance and the channel estimation performance based on the first through third exemplary embodiments of the present invention. In FIG. 14, a comparison between the channel estimation performance at the conventional receiver and the channel estimation performance at the receiver based on the first through third exemplary embodiments of the present invention is made using Mean Squared Error (MSE) calculated as shown in Equation (12).

$$MSE(dB) = 10 * \log 10 \left( \frac{1}{N} \sum_{k=0}^{N-1} |\tilde{H}(k) - H(k)|^2 \right) \tag{12}$$

where $\tilde{H}(k)$ denotes channel estimation results based on the conventional art and the first through third exemplary embodiments of the present invention, and $H(k)$ denotes an ideal frequency response of channels.

In the comparison illustrated in FIG. 14, it is assumed that pilot samples are inserted into 128 carriers from among 1024 carriers in an OFDM symbol at regular intervals, a simple linear interpolation method using 128 pilot samples is used for channel estimation, and the used channel environment is an ITU-R Pedestrian-B channel.

As can be understood from the comparison illustrated in FIG. 14, the first and second exemplary embodiments (Method 1 and Method 2) of the present invention exhibit substantially the same channel estimation performance which is also the best performance. The third exemplary embodiment (Method 3) of the present invention is not superior to the first and second exemplary embodiments of the present invention, but is superior to the conventional channel estimation scheme (Conventional). In terms of complexity, the first exemplary embodiment of the present invention requires complex multiplication after an FFT, but the second and third exemplary embodiments are comparatively simple since they only need to use the sample rotators 711 and 1109 before an FFT.

Therefore, in consideration of performance and complexity, it is ideal to implement the receiver according to the second exemplary embodiment of the present invention if implementation of the time delay estimation is easy, and it is ideal to implement the receiver according to the third exemplary embodiment of the present invention if implementation of the time delay estimation is difficult.

As is apparent from the foregoing description, exemplary embodiments of the present invention can address the channel estimation performance reduction problem caused by an FFT window setting at a receiver of an OFDM system, and improve the channel estimation performance even in a channel having a large time delay.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A receiver for estimating a channel in an orthogonal frequency division multiple access (OFDMA) system, the receiver comprising:
   a maximum estimator configured to estimate, from a reference signal received from a transmitter through multipaths, a delay value of a multipath having a maximum power among the multipaths;
   a rotator configured to circular-rotate a signal using the estimated delay value before the signal is input to a fast Fourier transform (FFT) unit; and
   a channel estimator configured to estimate a channel impulse response of the circular-rotated signal.

2. The receiver of claim 1, wherein the maximum estimator is further configured to estimate the delay value of the multipath having the maximum power using the following equation;

$$l_{max} = \max_l |h_l|^2$$

where $h_l$ denotes a channel impulse response of each multipath, and l denotes an index of a multipath.

3. The receiver of claim 1, wherein the rotator is further configured to reversely circular-rotate samples of the signal by using the estimated delay value if the signal is a time-domain signal before it is input to the FFT unit.

4. The receiver of claim 1, wherein the channel estimator is further configured to estimate the channel impulse response by extracting a pilot signal from the circular-rotated signal.

5. The receiver of claim 1, wherein the FFT unit applies an FFT to the circular-rotated signal, and the FFT-applied signal is used for estimating the channel impulse response.

6. A method for estimating a channel of a receiver in an orthogonal frequency division multiple access (OFDMA) system, the method comprising:
   estimating, by the receiver, from a reference signal received from a transmitter through multipaths, a delay value of a multipath having a maximum power among the multipaths;
   circular-rotating, by the receiver, a signal using the estimated delay value before the signal is input to a fast Fourier transform (FFT) unit; and
   estimating, by the receiver, a channel impulse response of the circular-rotated signal.

7. The method of claim 6, wherein the delay value of the multipath having the maximum power is estimated using the following equation;

$$l_{max} = \max_l |h_l|^2$$

where $h_l$ denotes a channel impulse response of each multipath, and l denotes an index of a multipath.

8. The method of claim 6, wherein circular-rotating the signal comprises:
   reversely circular-rotating samples of the signal by using the estimated delay value if the signal is a time-domain signal before it is input to the FFT unit.

9. The method of claim 6, wherein estimating the channel impulse response comprises:
   estimating the channel impulse response by extracting a pilot signal from the circular-rotated signal.

10. The method of claim 6, further comprising:
    applying an FFT to the circular-rotated signal,
    wherein the FFT-applied signal is used for estimating the channel impulse response.

* * * * *